Oct. 9, 1951          R. O. HATTEBURG          2,570,802
RACK FOR DELIVERY AUTOMOBILES
Filed Nov. 12, 1948
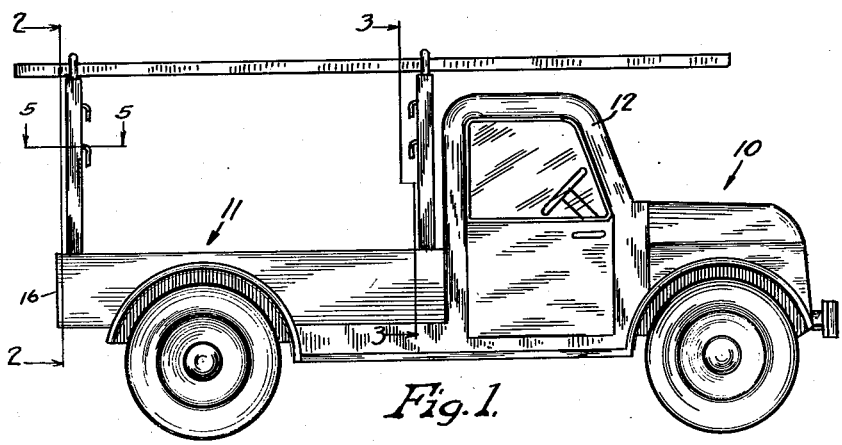
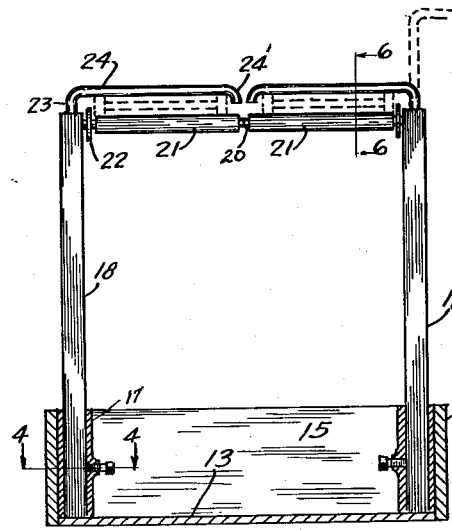
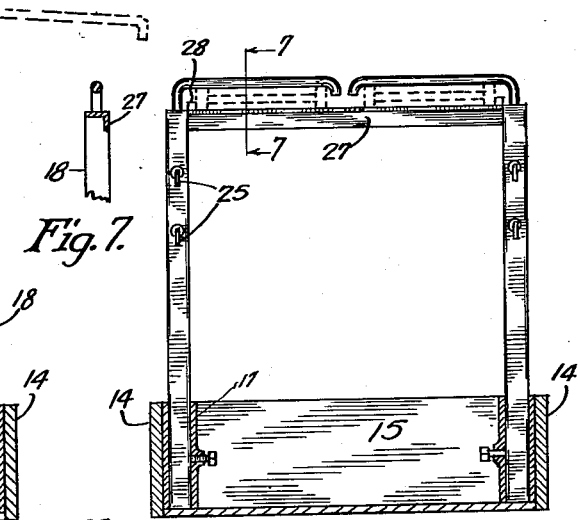
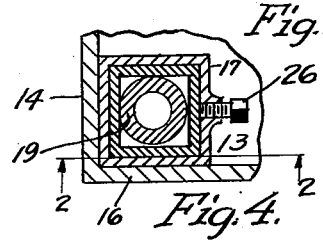
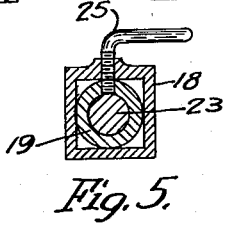
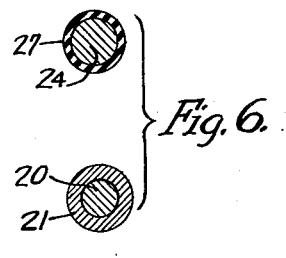
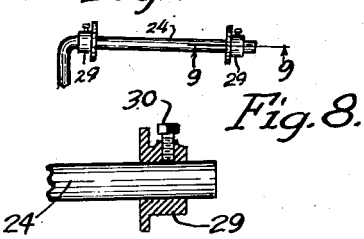
INVENTOR.
Robert O. Hatteburg
BY Martin E. Anderson
ATTORNEY Patented Oct. 9, 1951

2,570,802

UNITED STATES PATENT OFFICE 2,570,802

RACK FOR DELIVERY AUTOMOBILES

Robert O. Hatteburg, Denver, Colo.

Application November 12, 1948, Serial No. 59,605

10 Claims. (Cl. 224—42.45)

1

This invention relates to racks and more particularly to racks which may be attached to delivery automobiles commonly known as "pickups."

A principal object of the invention is to provide a rack for automobiles of the foregoing type which may be readily attached to existing socket portions of the delivery body.

Another object is to provide a rack which may support various articles such as ladders, lumber, pipe, and the like.

Another object is to provide clamping means for the rack which will engage elongated articles of different thickness and width.

Other objects are to provide a rack which is extremely simple and rugged in construction and can be fabricated from standard structural sections at low cost.

Still further objects and salient features will become more apparent from a consideration of the specification to follow, the appended claims, and the accompanying drawing, in which:

Figure 1 is a side elevation of a "pick-up" automobile showing the rack attached thereto.

Figure 2 is an enlarged section taken on line 2—2, Figures 1 and 4, certain portions of the automobile being omitted.

Figure 3 is a similar section taken on line 3—3, Figure 1.

Figure 4 is an enlarged section taken on line 4—4, Figure 2.

Figure 5 is an enlarged section taken on line 5—5, Figure 1.

Figure 6 is an enlarged section taken on line 6—6, Figure 2.

Figure 7 is a section taken on line 7—7, Figure 3.

Figure 8 is a fragmentary side elevation of a clamp which may be alternatively used with the rack shown in Figures 1 to 7, and Figure 9 is an enlarged section taken on line 9—9, Figure 8.

Referring in detail to the drawing there is shown in Figure 1 a conventional "pick-up" delivery automobile 10 having a delivery compartment 11 at the rear thereof and a cab 12 for accommodating the driver. The delivery compartment is constructed with a bottom 13, side walls 14, a front wall 15 and a rear wall 16. Each of the corners between these walls is provided with a rectangular socket 17 which is welded or otherwise secured to the delivery compartment, these sockets normally being used to receive stakes, a canopy for the delivery compartment, or other purpose as understood in the

2 art. The structure so far described is typical of automobiles of this type and forms no part of the invention per se.

The rack which forms the subject of this invention comprises two spaced rack members which are adapted to be secured in the front and rear pairs of sockets, respectively, which will now be described.

The rear rack is formed of a pair of rectangular tubes 18 which are proportioned to fit into the sockets previously described, these rectangular tubes each having a circular tube 19 therein extending the length thereof and welded thereto in any manner well known in the art. The rectangular tubes may be formed from a pair of angle irons welded along their edges or be of unitary construction.

The tops of the tubes 18 are secured together by a round solid rod 20 which rotatably carries a pair of rollers 21 which facilitate loading of articles on the rack. Washers 22 are welded to the rod 20 closely adjacent tubes 18, these forming abutments to limit outward movement of articles placed on the rack.

A clamp member is provided for each of the tubes 18, these clamp members being L-shaped with a vertical leg 23 telescoping within tube 19 and a lateral arm 24 overlying the rollers. The leg and arm are disposed at slightly less than 90 degrees as shown by the dotted position of the clamp in Figure 2. When the arm is forced down onto the article on the rack it springs to substantially 90 degrees relation and resiliently holds the article on the rack. The leg 23 is secured to the tube 18 by one or more screw members 25. The lower ends of tubes 18 are removably secured within the sockets 17 by set screws 26. A rubber sheath 27 (see Figure 6) may also be employed on arm 24 to resist movement of the article on the rack.

The front rack may be identical with the rear rack if desired. The rollers are not always necessary on the front rack, however, hence the front rack is disclosed slightly modified. Instead of employing a rod and rollers as previously described an angle iron 27, or flat bar, is substituted and suitable abutments 28 are welded at the ends which perform the same function as washers 22.

In Figure 8 is shown an alternative form of clamp which may be used instead of the one previously described. This clamp is identical in all respects except that hooked end 24' need not be employed, and one or more slideable abutments 29 are provided on arm 24 which may be secured in any desired position on the arm by a set screw 30. With this construction a strip of lumber, pipe, etc., can be precluded from moving sidewise on the rack, the arm holding it down on the rack.

In use, the screws 25 are loosened and the arms 24 swung to the position shown in dotted lines in Figure 2. The end of a ladder 31, or other long article, is placed on a roller 21 and moved upwardly, at an angle, and when in the desired position on the rear rack is lowered onto the front rack. The arms are then swung back to the full line position and forced downwardly on the article simultaneously clamping the screws 25. The arm is then in a sprung condition and will resiliently hold the article from longitudinal movement. The washers 22, hooks 24', and abutments 28 prevent lateral movement, or if the abutments 29 are employed they serve the same purpose.

Having described the invention what is claimed as new is:

1. In an automobile having a substantially rectangular compartment at the rear thereof formed by spaced side and end walls, the compartment having vertical sockets at the corners where a side wall joins an end wall, the combination with said compartment, of a pair of rack members, each rack member having a pair of vertical tubes secured in corresponding corner sockets spaced laterally of the longitudinal axis of the compartment, horizontal means securing each pair of tubes together above the sockets, and at least one clamp for each rack, the clamp having a leg telescoping in a tube and an arm extending over the horizontal means, for securing an article thereto, and means for securing the leg to a tube in various positions of vertical adjustment, whereby the distance between the horizontal means and arm of the clamp may be varied to clamp articles of different thickness.

2. A device in accordance with claim 1 wherein the horizontal means extends between the tops of each pair of tubes.

3. A device in accordance with claim 1 wherein the horizontal means on at least one rack rotatably supports at least one roller.

4. A device in accordance with claim 1 wherein the horizontal means on at least one rack rotatably supports at least two spaced rollers, and each tube of said rack carries an individual clamp.

5. A device in accordance with claim 1 wherein the horizontal means on one rack rotatably supports at least two spaced rollers, the horizontal means on the other rack is a bar over which an article must slide whereby it frictionally resists movement thereon, and a clamp is carried by each tube.

6. A device in accordance with claim 1 wherein the leg and arm of a clamp are disposed at an acute angle and are joined by a resilient portion.

7. A device in accordance with claim 1 wherein the clamp has a resilient portion and is adapted to resiliently urge an article against the horizontal means in any position of vertical adjustment of the clamp.

8. A device in accordance with claim 1 wherein the leg of a clamp member is rotatably supported in a tube, whereby the arm may be swung to a position outwardly of the frame to permit lowering an article onto the rack.

9. In an automobile having a substantially rectangular compartment at the rear thereof formed by spaced side and end walls, the compartment having vertical sockets at the corners where a side wall joins an end wall, the combination with said compartment, of front and rear rack members, each rack member having a pair of vertical tubes secured in corresponding corner sockets spaced laterally of the longitudinal axis of the compartment, a horizontal bar securing the front pair of vertical tubes together at the tops thereof on which an article may slide and be frictionally engaged thereby to resist movement thereon, a horizontal bar securing the rear pair of vertical tubes together at their tops, at least one roller rotatably supported by said last named bar, a clamp for each vertical tube, each clamp having a leg telescoping in a vertical tube and an arm extending over the horizontal bar adjacent thereto, and means for securing the leg to a tube in various positions of vertical adjustment, whereby the distance between the horizontal bars and the arms may be varied to clamp articles of different thickness supported above the front and rear bars.

10. A device in accordance with claim 9 wherein the leg of a clamp member is rotatably supported in a vertical tube whereby the arm may be swung to a position outwardly of the frame to permit lowering an article onto the top of the rack.

ROBERT O. HATTEBURG.

REFERENCES CITED

The following references are of record in the file of this patent:

UNITED STATES PATENTS

| Number | Name | Date |
| --- | --- | --- |
| 70,006 | Leslie et al. | Oct. 22, 1867 |
| 912,149 | Murray | Feb. 9, 1909 |
| 1,099,924 | Johnson | June 16, 1914 |
| 1,991,900 | Larsen | Feb. 19, 1935 |
| 2,134,823 | Herrmann et al. | Nov. 1, 1938 |
| 2,237,853 | Troche | Apr. 8, 1941 |
| 2,314,331 | Fallis | Mar. 23, 1943 |
| 2,469,945 | Brei | May 10, 1949 |

FOREIGN PATENTS

| Number | Country | Date |
| --- | --- | --- |
| 447,912 | France | Nov. 11, 1912 |
| 547,992 | Great Britain | Sept. 21, 1942 |